United States Patent [19]
Cassetti

[11] Patent Number: 5,535,360
[45] Date of Patent: Jul. 9, 1996

[54] DIGITAL COMPUTER SYSTEM HAVING AN IMPROVED DIRECT-MAPPED CACHE CONTROLLER (WITH FLAG MODIFICATION) FOR A CPU WITH ADDRESS PIPELINING AND METHOD THEREFOR

[75] Inventor: David K. Cassetti, Tempe, Ariz.

[73] Assignee: VLSI Technology, Inc., San Jose, Calif.

[21] Appl. No.: 298,989

[22] Filed: Aug. 31, 1994

[51] Int. Cl.$^6$ .................................................. G06F 12/08
[52] U.S. Cl. ........................ 395/467; 395/496; 395/403; 364/DIG. 1; 364/DIG. 2; 364/243.41; 364/231.8; 364/964.26
[58] Field of Search ................................. 395/425, 467, 395/403, 496, 375; 364/200 MS File, 900 MS File

[56] References Cited

U.S. PATENT DOCUMENTS

| | | | |
|---|---|---|---|
| 3,705,388 | 12/1972 | Nishimoto | 395/445 |
| 4,151,593 | 4/1979 | Jenkins et al. | 395/494 |
| 4,169,284 | 9/1979 | Hogan et al. | 395/467 |
| 4,680,702 | 7/1987 | McCarthy | 395/775 |
| 4,855,904 | 8/1989 | Daberkow et al. | 395/375 |
| 5,073,851 | 12/1991 | Masterson et al. | 395/467 |
| 5,117,493 | 5/1992 | Jensen | 395/467 |
| 5,148,536 | 9/1992 | Witek et al. | 395/467 |
| 5,303,364 | 4/1994 | Mayer et al. | 395/467 |
| 5,361,337 | 11/1994 | Okin | 395/375 |

*Primary Examiner*—Matthew M. Kim
*Attorney, Agent, or Firm*—Harry M. Weiss & Associates

[57] ABSTRACT

A digital computer system having a "smart" cache controller that permits the system to take advantage of CPU address pipelining while minimizing the performance impact of a pipelined cache read miss in a system with a relatively low hit ratio such as a direct mapped cache.

10 Claims, 2 Drawing Sheets

Cache Controller Circuit
Flag Modification Block

| Same Block? | Same Tag? | Same Entry? | Case Pending | Case Pipelined | Modified Case | Cache Command |
|---|---|---|---|---|---|---|
| Y | Y | Y | RD Vmiss | RD Vmiss | * RD Hit | Null |
| Y | Y | Y | RD Vmiss | WR Vmiss | WR Hit | † Write |
| Y | Y | Y | RD Tmiss | RD Tmiss | * RD Hit | Null |
| Y | Y | Y | RD Tmiss | WR Tmiss | WR Hit | † Write |
| Y | Y | Y | WR Hit | RD Hit | * RD Hit | Null |
| Y | Y | Y | WR Vmiss | RD Vmiss | * RD Hit | Null |
| Y | Y | Y | WR Vmiss | WR Vmiss | WR Hit | † Write |
| Y | Y | N | RD Tmiss | RD Tmiss | RD Vmiss | Update |
| Y | Y | N | RD Tmiss | WR Tmiss | WR Vmiss | Update |
| Y | N | - | RD Tmiss | RD Vmiss | RD Tmiss | Replace |
| Y | N | - | RD Tmiss | WR Hit | WR Tmiss | Null |
| Y | N | - | RD Tmiss | WR Vmiss | WR Tmiss | Null |

\* RD Hit Data Source = Data From Pending Cycle
† Write Equivalent to Update

FIG. 2

DIGITAL COMPUTER SYSTEM HAVING AN IMPROVED DIRECT-MAPPED CACHE CONTROLLER (WITH FLAG MODIFICATION) FOR A CPU WITH ADDRESS PIPELINING AND METHOD THEREFOR

BACKGROUND OF THE INVENTION

1. Field of the Invention

This invention relates generally to digital computer systems having cache RAM memories and, more specifically, to a digital computer system having an improved cache controller for a CPU with address pipelining and method therefor.

2. Description of the Related Art

Many digital computer systems employ second level (L2) cache memories in order to improve system performance. The L2 cache, well known in the art, is a relatively small and fast memory device that is loaded with information, either instruction code or data, from a slave device such as the main memory (RAM) or other external memory device. Using the property of locality of reference, this information has a statistically good chance of being needed by the CPU in a future cycle. Among the various types of cache memories, direct-mapped cache memories are relatively small in terms of real estate and inexpensive and are therefore more desirable than other types of caches, such as the larger and more costly set-associative cache memory, for improving the system performance of lower cost microprocessor based products, such as limited purpose PC systems, palmtops, personal organizers and other similar products.

In order to map the cache to the slave device, such as the main memory, a direct-mapped cache divides the address in the main memory that the CPU needs to access into three fields. The tag field constitutes a set number of the most significant bits of the address. The other two fields, the block and entry fields, constitute the remaining bits of the address and together are called the index. The block represents the general area in memory within the requested word of information is found and the entry represents the specific word being accessed. The number of bits in the index field represents the number of address bits required to access the cache memory. Each word in the cache consists of the data or code word and its associated tag. There is also typically an additional bit, associated with each entry (word) field in the cache, called a valid bit, to indicate whether or not the word contains valid data. When the CPU generates a memory request, the index field (block and entry) is used for the address to access the cache. The tag field of the address is compared with the tag in the word read from the cache. If the two tags match and the valid bit indicates the information in the entry (word) is valid, there is a "hit". The cache then supplies two flags to the cache controller, one indicating there is a tag match (Tmatch) and the other indicating there is a valid match (Vmatch) and the desired word is read from the cache. If there is no match, because of either a tag miss (Tmiss) or a valid miss (Vmiss), there is a "miss" and the required word is read from main memory. An entire block of words (sequential addresses) within which the required word resides in main memory is then brought into the cache replacing the previous block of information.

Although direct-mapped cache memories improve CPU performance whenever a hit occurs, the cache hit-to-miss ratio, or, efficiency, of direct-mapped caches is relatively low when compared with other types of caches. For example, the hit ratio of direct-mapped caches is about 70% as compared to the 90%+ hit ratio of other, larger and more sophisticated caches. However, because direct-mapped caches are relatively inexpensive and small and desirable for many applications, there existed a definite need to further improve the efficiency of systems designed with direct-mapped caches.

Some central processing units (CPU's), such as Intel's 386 microprocessor, offer a feature called address pipelining whereby the CPU presents address and status information for the upcoming CPU cycle before the current cycle has completed. In the past, address pipelining was successfully employed to improve CPU performance for non-memory read cycles, non-cacheable memory read cycles and memory read cycles with no cache present. The use of CPU address pipelining was a potentially attractive solution for improving the performance of cacheable read cycles, as well, and could, therefore, improve overall performance in a system designed with direct-mapped caching. However, if address pipelining was used to perform an early search (read) of the cache for a potential hit for the "pipelined" cycle before the current cycle completed its operation an inherent problem would exist. Specifically, there are a number of conditions where the cache would return the wrong flags for the pipelined cycle simply because the current cycle had not yet completed it operation. For example, the current CPU cycle is executing a read operation to memory address "x" in main memory. The location in the cache that corresponds to the index field of the address is checked to determine if there is a hit. In this case there is a miss, either because of a Tmiss or Vmiss. Therefore the CPU must retrieve the required word from the slave memory and the cache must be loaded with a new block containing the required word. In the meantime, however, the CPU puts out an early pipelined address which happens to be to the same address as the current cycle in progress. The cache controller issues a read command to the cache. Although this next read should properly be a hit in the cache, the cache will return flags that indicate an erroneous miss because this read of the cache is out of cycle (i.e. too early) and the cache has not yet been loaded with the new block from the current cycle. Unnecessarily and inefficiently, the CPU will then read and retrieve this pipelined cycle from the relatively slow slave memory.

Therefore, there existed a need to provide digital computer system having a "smart" cache controller that would enable the system to take advantage of CPU address pipelining while minimizing the performance impact of a pipelined cache read miss in a system with a relatively low hit ratio such as a direct-mapped cache.

SUMMARY OF THE INVENTION

In accordance with one embodiment of this invention, it is an object of this invention to provide an improved digital computer system and method.

It is another object of this invention to provide an improved digital computer system and method having an improved cache controller subsystem.

It is a further object of this invention to provide an improved digital computer system and method having a smart cache controller to permit the system to take advantage of CPU address pipelining while minimizing the performance impact of a pipelined cache read miss in a system with a relatively low hit ratio such as a direct mapped cache.

BRIEF DESCRIPTION OF THE PREFERRED EMBODIMENTS

In accordance with one embodiment of this invention, a digital computer system is provided having a cache controller subsystem. The system comprises, in combination, a central processing unit (CPU) having means for address pipelining; cache random access memory (RAM) means coupled to the CPU for: (a) providing temporary storage of portions of information for submission to the CPU upon request by the CPU, (b) providing cache flags for each command received for signalling whether a cache hit or a cache miss occurred, and (c) reducing an amount of time required for the CPU to access the portions of information. The system further includes memory means coupled to the CPU and the cache RAM means for storing information for selection by the CPU and for providing information to the cache RAM means after the CPU encounters a read miss in the cache RAM means; and cache controller means coupled to the cache RAM means and the CPU for controlling the transmission of the information between the cache RAM means and the CPU for both a current CPU cycle and a subsequent, piplelined CPU cycle prior to completing the current CPU cycle.

In accordance with another embodiment of this invention, a method of operating a digital computer system which includes a cache controller subsystem comprises the steps of: providing a central processing unit (CPU) having means for address pipelining; providing cache random access memory (RAM) means coupled to the CPU for: (a) providing temporary storage of portions of information for submission to the CPU upon request by said CPU, (b) providing cache flags for each command received for signalling whether a cache hit or a cache miss occurred, and (c) reducing an amount of time required for the CPU to access the portions of information. The method of operating the digital computer system further comprises coupling memory means to the CPU and the cache RAM means for storing information for selection by the CPU and for providing information to the cache RAM means after said CPU encounters a read miss in the cache RAM means; and coupling cache controller means to the cache RAM means and the CPU for controlling the transmission of the information between the cache RAM means and the CPU for both a current CPU cycle and a subsequent, piplelined CPU cycle prior to completing the current CPU cycle.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 2 is a chart showing the detailed operation of the flag modification block of FIG. 1.

DESCRIPTION OF THE PREFERRED EMBODIMENT(S)

Figure 1:
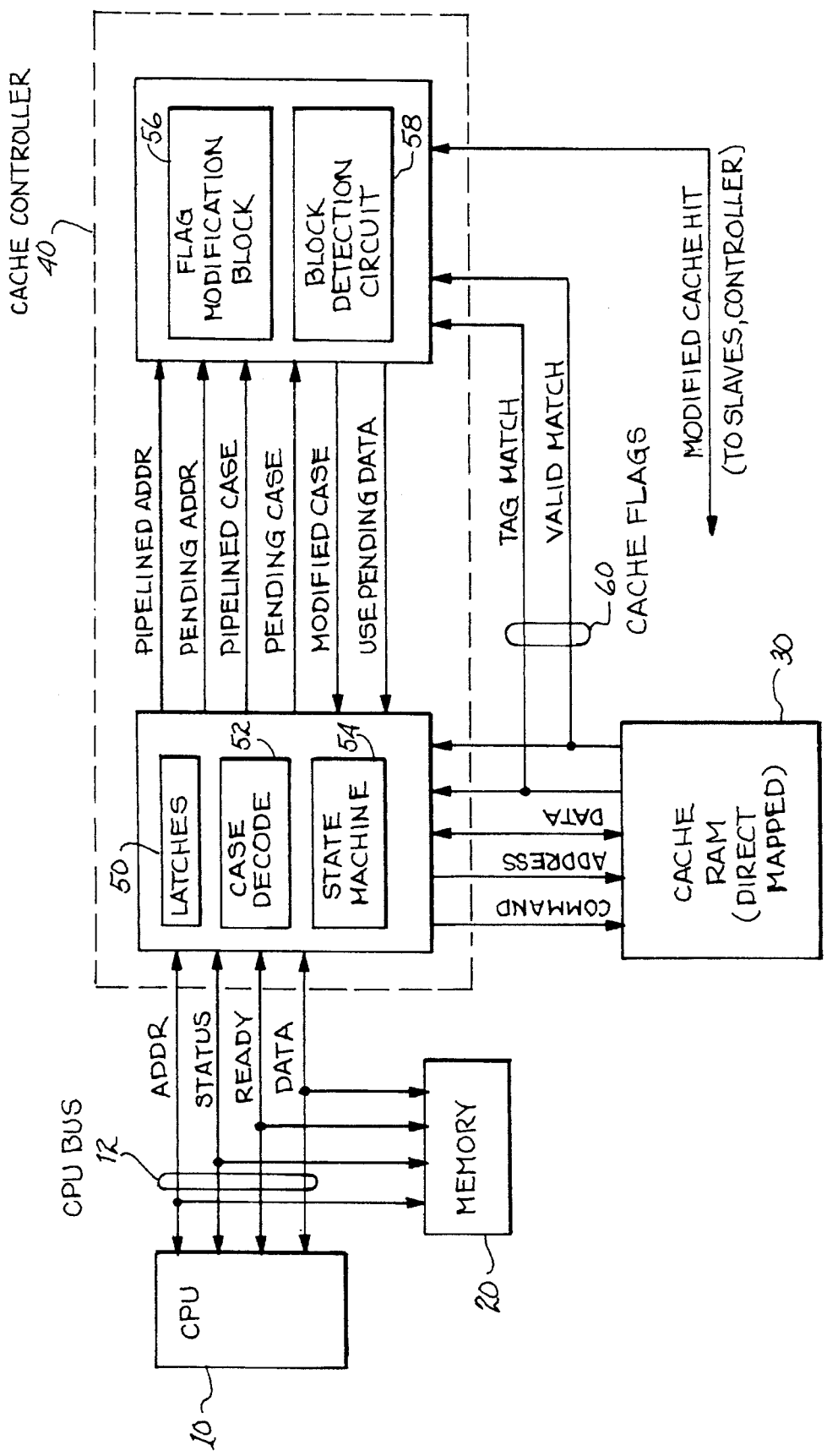
FIG. 1 is a simplified block diagram showing a portion of a digital computer system having an improved cache controller.

Referring to FIG. 1, a portion of a digital computer system having an improved cache controller is disclosed. Central processing unit 10 (hereinafter, CPU 10), supports address pipelining, such as the Intel 386, in which address and status information are presented for the next cycle before the current cycle has completed. Memory 20 is coupled to CPU 10 through CPU bus 12. Memory 20 may be comprised of a main random access memory (RAM) or other external memory device. Direct-mapped lookaside cache RAM 30 is provided for storing portions of information from memory 20 that are "active" with the CPU 10. Cache RAM 30 provides cache flags 60, one which indicates whether cache RAM 30 encountered a tag hit or miss and the other which indicates whether cache RAM 30 encountered a valid bit hit or miss. Cache controller 40 is comprised of address, data and status latches 50 for both the cycle in progress and the pipelined cycle, case decode circuitry 52 for interpreting the output of cache flags 60, and state machine 54 for controlling cache RAM 30 and to steer information (whether data or instruction code) between cache RAM 30 and CPU 10. Cache controller 40 is further comprised of same block detection circuitry 56 for determining whether the pipelined read or write cycle is from (or to) the same block as the current cycle, and flag modification block 58 for modifying cache flags 60 if the pipelined read or write cycle is from (or to) the same block as the current read or write cycle.

Referring to FIG. 2, chart 100 describes the operation of flag modification block 58. In the situation where CPU 10 accesses an entry (or word) in the pipelined cycle, whose address is located in the same block as the address of the cycle in progress, flag modification block 58 modifies the pipelined case according to chart 100 and as described below.

OPERATION

The direct mapped cache responds to the following basic command set:
1) Flush: clear all valid bits,
2) Read: return a hit status, and data if a hit,
3) Replace: replace the tag (meaning the whole block), set the valid bit for the updated entry (word) and clear other valid bits in the block,
4) Update: update the entry data and its associated valid bit.

For the purposes of this description, all CPU memory cycle fall into one of six cases with the resulting cache RAM command for a completed memory cycle:

| Case | resulting in: | cache command |
| --- | --- | --- |
| Read hit | | Null |
| Read miss, tag match/valid miss | | Update |
| Read miss, tag miss | | Replace |
| Write Hit | | Update |
| Write miss, tag match/valid miss | | Update |
| write miss, tag miss | | Null |

The operation of the disclosure is as follows: When CPU 10 puts out an early pipelined address for a cacheable memory cycle, cache controller 40 issues a read command to cache RAM 30. This cache RAM 30 access is considered out of sequence because a cycle is still in progress. That is, the current CPU cycle has not yet retrieved the needed information from memory 20 and has not yet completed the update or replace commands to cache RAM 30, in the event of a cache miss. If this early, pipelined read command is to a different block than the cycle in progress, same block detection circuitry 56 recognizes this and determines that no flag modification is necessary. If, however, the read command is accessing the same block as the cycle in progress, then the cache flags may not be valid, since the future state of the block depends on the cycle in progress. Same block detection circuitry 56 then enables flag modification block 58. Flag modification block 58 determines the correct cache flags and whether read hit data (or code) comes from cache RAM 30 or from the memory cycle in progress. Chart 100 describes the detailed function of flag modification block 58.

To explain the operation of flag modification block 58 by way of example, first case of chart 100 is now examined. In this example, the current CPU cycle and the next, pipelined CPU cycle are accessing the address, that is, the same block, the same tag and the same entry (word) for consecutive read operations of the same word. The current, pending cycle examined cache RAM 30 which returned cache flags 60 indicating a tag match but a valid miss, or "RD Vmiss". As described above, this case results in CPU 10 going to memory 20 for its required information and also results in the cache command of "Update" whereby the entry for the accessed location in cache RAM 30 is loaded with new data (or code) from memory 20 and its valid bit is set. While this "Update" command is executing, CPU 10 issues the pipelined read command to the identical address. As cache RAM 30 has not yet completed its update to that cache location, cache RAM 30 will return the very same flags indicating that this pipelined cycle, as its predecessor, is an "RD Vmiss." This response is erroneous because the upcoming "Update" will, in fact, load cache RAM 30 with the information the pipelined cycle is looking for. The "correct" flag response for the pipelined cycle should be a "RD Hit." Therefore, flag modification block 58 "overrides" the pipelined flags and accomplishes the function of returning the correct "RD Hit" (Tag hit, valid hit) flags and its associated cache command.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A digital computer system having a cache controller subsystem thereof comprising, in combination:

a central processing unit (CPU) having means for address pipelining;

cache random access memory (RAM) means coupled to said CPU for:
 (a) providing temporary storage of portions of information for submission to said CPU upon request by said CPU,
 (b) providing cache flags for each command received for signalling whether a cache hit or a cache miss occurred and
 (c) reducing an amount of time required for said CPU to access said portions of information;

memory means coupled to said CPU and said cache RAM means for storing information for selection by said CPU and for providing information to said cache RAM means after said CPU encounters a read miss in said cache RAM means; and cache controller means coupled to said cache RAM means and said CPU for comparing an address of a pipelined CPU cycle to an address of a current CPU cycle and for modifying said cache flags provided by said cache RAM means when a pipelined read command is to a same block as said current CPU cycle for controlling the transmission of said portions of information between said cache RAM means and said CPU for both said current CPU cycle and a subsequent, pipelined CPU cycle prior to completing said current CPU cycle.

2. The system of claim 1 wherein said cache controller means comprises:

address, status and data latches for both said current CPU cycle and said pipelined CPU cycle;

state machine means coupled to both said CPU and said cache RAM means for issuing a pipelined read command to said cache RAM means for each cacheable pipelined address generated by said CPU before said current CPU cycle is completed and for directing the flow of said portions of information between said cache RAM means and said CPU;

case decode means for reading and decoding said cache flags provided by said cache RAM means;

flag modification means coupled to said cache RAM means for modifying said cache flags provided by said cache RAM means when necessary; and same block detection means coupled to said address latches and flag modification means for comparing the address of said pipelined CPU cycles to the address of said current CPU cycle and for enabling said flag modification means only when said pipelined read command is to the same block as said current CPU cycle.

3. The system of claim 2 wherein said cache RAM means is a direct-mapped cache RAM.

4. The system of claim 2 wherein said flag modification means modifies said cache flags resulting from said pipelined read command to said cache RAM means according to a predetermined outcome depending on the combination of cache flags resulting from both said current cycle and said pipelined cycle.

5. The system of claim 4 wherein said modified pipelined cache flags result in modified and corrected pipelined cache RAM commands for use upon completion of said current cycle.

6. A computer implemented method of operating a digital computer system which includes a cache controller subsystem comprising the steps of:

providing a central processing unit (CPU) having means for address pipelining;

providing cache random access memory (RAM) means coupled to said CPU for:
 (a) providing temporary storage of portions of information for submission to said CPU upon request by said CPU,
 (b) providing cache flags for each command received for signalling whether a cache hit or a cache miss occurred and
 (c) reducing an amount of time required for said CPU to access said portions of information;

coupling memory means to said CPU and said cache RAM means for storing information for selection by said CPU and for providing information to said cache RAM means after said CPU encounters a read miss in said cache RAM means; and coupling cache controller means to said cache RAM means and said CPU for comparing an address of a pipelined CPU cycle to an address of a current CPU cycle and for modifying said cache flags provided by said cache RAM means when a pipelined read command is to a same block as said current CPU cycle for controlling the transmission of said portions of information between said cache RAM means and said CPU for both said current CPU cycle and a subsequent, pipelined CPU cycle prior to completing said current CPU cycle.

7. The computer implemented method of claim 6 wherein said cache controller means comprises:

address, status and data latches for both said current CPU cycle and said pipelined CPU cycle;

state machine means coupled to both said CPU and said cache RAM means for issuing a pipelined read command to said cache RAM means for each cacheable pipelined address generated by said CPU before said current CPU cycle is completed and for directing the flow of said portions of information between said cache RAM means and said CPU;

case decode means for reading and decoding said cache flags providing by said cache RAM means;

flag modification means coupled to said cache RAM means for modifying said cache flags provided by said cache RAM mens when necessary; and same block detection means coupled to said address latches and flag modification means for comparing the address of said pipelined CPU cycles to the address of said current CPU cycle and for enabling said flag modification means only when said pipelined read command is to the same block as said current CPU cycle.

8. The computer implemented method of claim 7 wherein said cache RAM means is a direct-mapped cache RAM.

9. The computer implemented method of claim 7 wherein said flag modification means modifies said cache flags resulting from said pipelined read command to said cache RAM means according to a predetermined outcome depending on the combination of cache flags resulting from both said current cycle and said pipelined cycle.

10. The computer implemented method of claim 9 wherein said modified pipelined cache flags result in modified and corrected pipelined cache RAM commands for use upon completion of said current cycle.

* * * * *